United States Patent [19]

Yamada

[11] Patent Number: 5,690,137

[45] Date of Patent: Nov. 25, 1997

[54] SPINDLE DEVICE

[75] Inventor: Shigeru Yamada, Takaoka, Japan

[73] Assignee: Kitamura Machinery Co., Ltd., Japan

[21] Appl. No.: 688,873

[22] Filed: Jul. 31, 1996

[30] Foreign Application Priority Data

Aug. 11, 1995 [JP] Japan .................. 7-226084

[51] Int. Cl.⁶ .................. B08B 5/00; B23B 27/10; B23Q 3/12; B23Q 11/12
[52] U.S. Cl. .................. 137/240; 137/334; 408/57; 409/136; 409/233
[58] Field of Search .................. 137/238, 240, 137/334, 340; 408/56, 57; 409/136, 231, 233

[56] References Cited

U.S. PATENT DOCUMENTS

| | | | |
|---|---|---|---|
| 3,568,566 | 3/1971 | Weidig | 409/233 |
| 4,583,892 | 4/1986 | Armbruckner | 408/56 |
| 4,915,553 | 4/1990 | Lazarevic | 408/56 |
| 4,921,376 | 5/1990 | Tani et al. | 408/56 |
| 4,951,578 | 8/1990 | Von Haas et al. | 408/56 |
| 4,997,325 | 3/1991 | Heel et al. | 409/233 |
| 5,096,347 | 3/1992 | Kumagai et al. | 409/233 |

FOREIGN PATENT DOCUMENTS

| | | | |
|---|---|---|---|
| 32 43 112 | 7/1983 | Germany . | |
| 33 19 618 | 12/1984 | Germany . | |
| 0 368 023 | 10/1989 | Germany . | |
| 88 06 862 | 11/1989 | Germany . | |
| 1144878 | 9/1979 | Japan | 408/57 |
| 0102553 | 6/1984 | Japan | 408/56 |
| 59-69103 | 11/1984 | Japan . | |
| 60-034245 | 2/1985 | Japan . | |
| 0118407 | 6/1985 | Japan | 408/56 |
| 0434023 | 6/1991 | Japan | 408/57 |
| 7-290342 | 11/1995 | Japan . | |

*Primary Examiner*—George L. Walton
*Attorney, Agent, or Firm*—Ronald P. Kananen

[57] ABSTRACT

A spindle device for supplying air for cleaning and a coolant for cooling or lubricating, including: a tool holder (11) with a coolant passage (22) through which a coolant is supplied; a spindle (10) having a support surface (26) formed at the front portion thereof for accepting the tool holder (11); a drawing bolt (25) having a through-hole for supplying air or a coolant and movably arranged in the spindle (11) for clamping or unclamping the tool holder (11) accepted on the support portion (26) of the spindle (11); and a pull stud (12) attached on the tool holder (11) and provided with a valve (13), the valve (13) being located in association with the coolant passage (22) and the through-hole, the valve (13) being so constructed as to open or close according to the movement of the drawing bolt (25) in such a manner that the valve (13) opens so as to connect the through-hole to the coolant passage (22) when the tool holder (11) is clamped, whereas the valve (13) temporarily closes so as to shut the connection between the through-hole and the coolant passage (22) when the tool holder (11) is unclamped, wherein a coolant can be supplied from the through-hole to the coolant passage (22) via the valve (13) when the tool holder (11) is clamped, whereas air can be supplied from the through-hole by bypassing the coolant passage (22) when the tool holder (11) is unclamped.

9 Claims, 3 Drawing Sheets

SPINDLE DEVICE

BACKGROUND OF THE INVENTION

This invention relates to a spindle device for supplying air for cleaning and a coolant for cooling or lubricating, and more particularly to a spindle device comprising a tool holder with a coolant passage through which a coolant is supplied, a spindle having a support portion formed at the front end thereof for accepting the tool holder, and a drawing bolt movably arranged in the spindle for clamping or unclamping the tool holder held by the spindle.

Japanese Patent Application No. 54-114878 discloses a coolant supply device constructed such that a coolant and air are supplied via a through-hole formed in a drawing bolt.

The coolant is supplied to a tool and in the vicinity of a cutting area of the workpiece during cutting steps for cooling and preventing wear. The coolant is supplied through a coolant passage formed on the axis of a tool holder.

On the other hand, air is blown when the old tool holder is released from the support portion of the spindle and the new tool holder is set to the spindle, so that chips are prevented from being deposited between the support portion of the spindle and the tool holder. According, air blow improves the accuracy in mounting the tool holder on the spindle.

In such coolant supply device, a coolant and air are supplied via a common channel and discharged from a common exhaust port on the axis. Therefore, when air is blown, a part of the air is inconveniently supplied to the coolant passage of the tool holder. As a result, the efficiency of the air blow deteriorates.

The applicant has proposed a spindle device constructed such that an air is blown from a separate outlet distant from the axis, as disclosed in Japanese Patent Application No. 6-104287.

This spindle device has a valve means arranged on the spindle, and a special air passage distant from the axis for discharging an air blow. Therefore the spindle must be specially designed on this account.

It is an object of the present invention to provide a spindle device which is low in cost and has wide applicability, without requiring such a valve means disposed on the spindle and a special air passage formed on the spindle as in the spindle device described in Japanese Patent Application No. 6-104287.

SUMMARY OF THE INVENTION

According to the invention, the spindle device for supplying air for cleaning and a coolant for cooling or lubricating comprises a tool holder having a coolant passage through which a coolant is supplied, a spindle having a support portion defined at the front end thereof for accepting the tool holder, a drawing bolt having a through-hole for supplying air or a coolant and movably arranged in the spindle for clamping or unclamping the tool holder accepted on the support portion of the spindle, and a pull stud attached on the tool holder and provided with a valve, the valve being located in association with the coolant passage and the through-hole, the valve being so constructed as to open or close according to the movement of the drawing bolt in such a manner that the valve opens so as to connect the through-hole to the coolant passage when the tool holder is clamped, whereas the valve temporarily closes so as to shut the connection between the through-hole and the coolant passage when the tool holder is unclamped, wherein a coolant can be supplied from the through-hole via the valve to the coolant passage when the tool holder is clamped, whereas air can be supplied from the through-hole by bypassing the coolant passage when the tool holder is unclamped.

According to the spindle device of this invention, the valve is preferably located at the rear portion of the tool holder and is preferably constructed as a slide valve. The slide valve can be constructed by a slidable stop needle as a valve body biased by a spring and a valve seat formed on the rear portion of the pull stud. The valve seat can have a cone surface and the stop needle can have a truncated cone surface cooperating with the cone surface of the valve seat. The slide valve is preferably constructed in such a manner that the stop needle is directly pushed forward by an inner sleeve attached at the front end of the drawing bolt when the tool holder is unclamped.

The stop needle can have a radial channel on the rear face thereof, and the pull stud can have a radial slot connectable to the radial groove of the stop needle. When the valve is closed, the channel and the slot are connected to each other so as to form an air passage. The radial channel is, for example, a cross channel. An annular groove is preferably formed between the cross groove and the radial slot when the valve is closed.

According to the spindle device of the present invention, the air blow can be concentrated in the area to be cleaned.

Further, in the spindle device according to the present invention, it is not necessary to provide a special air passage formed on the spindle and the valve means disposed on the spindle but only the pull stud having a valve is necessary to be attached on the tool holder, thus the spindle device with wide applicability can be provided at low cost.

DESCRIPTION OF PREFERRED EMBODIMENT

An embodiment according to the present invention will be described hereinafter with reference to the drawings.

Figure 1:
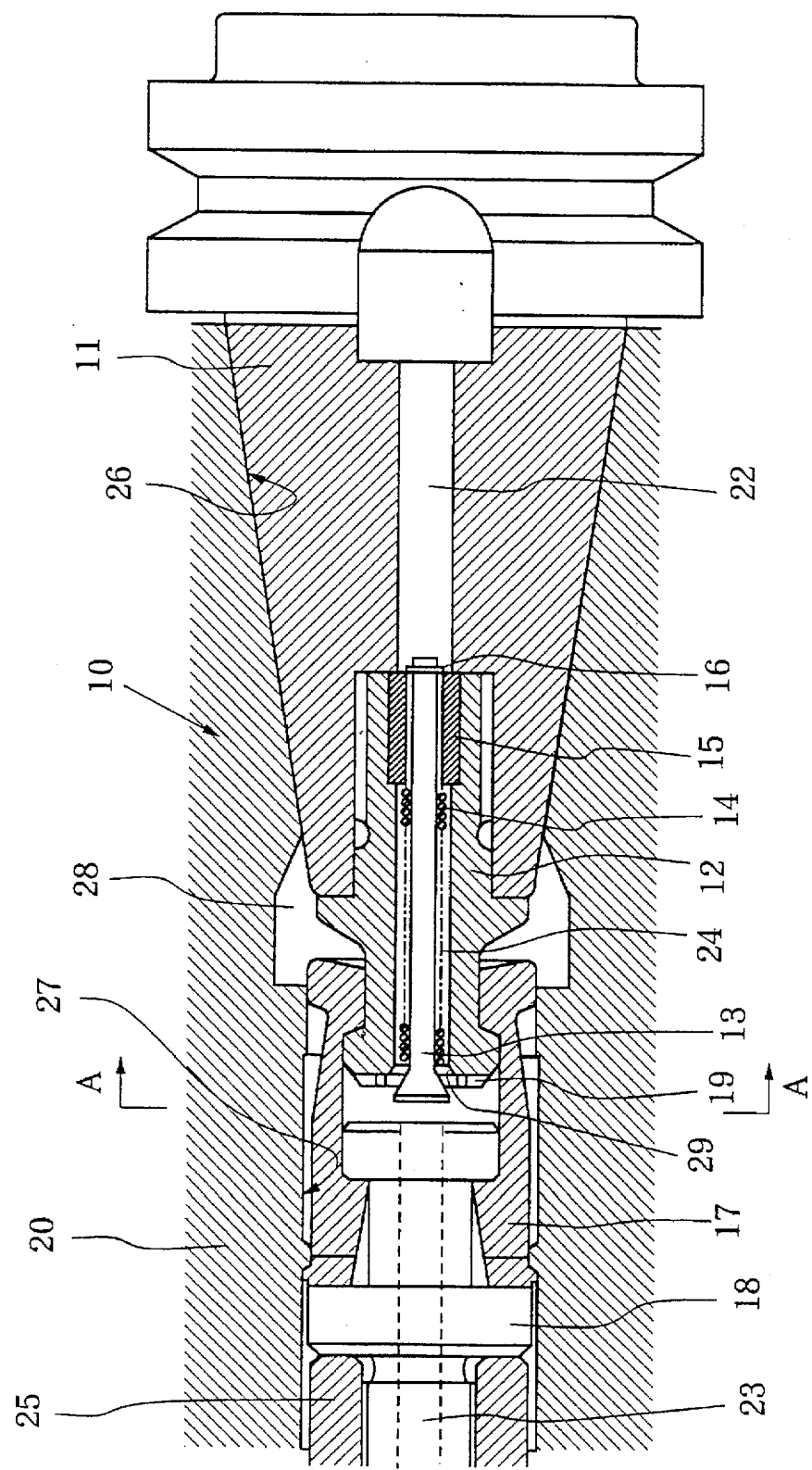
FIG. 1 is a sectional view showing a spindle device according to an embodiment of the present invention, showing the state where a tool holder is mounted.
Figure 2:
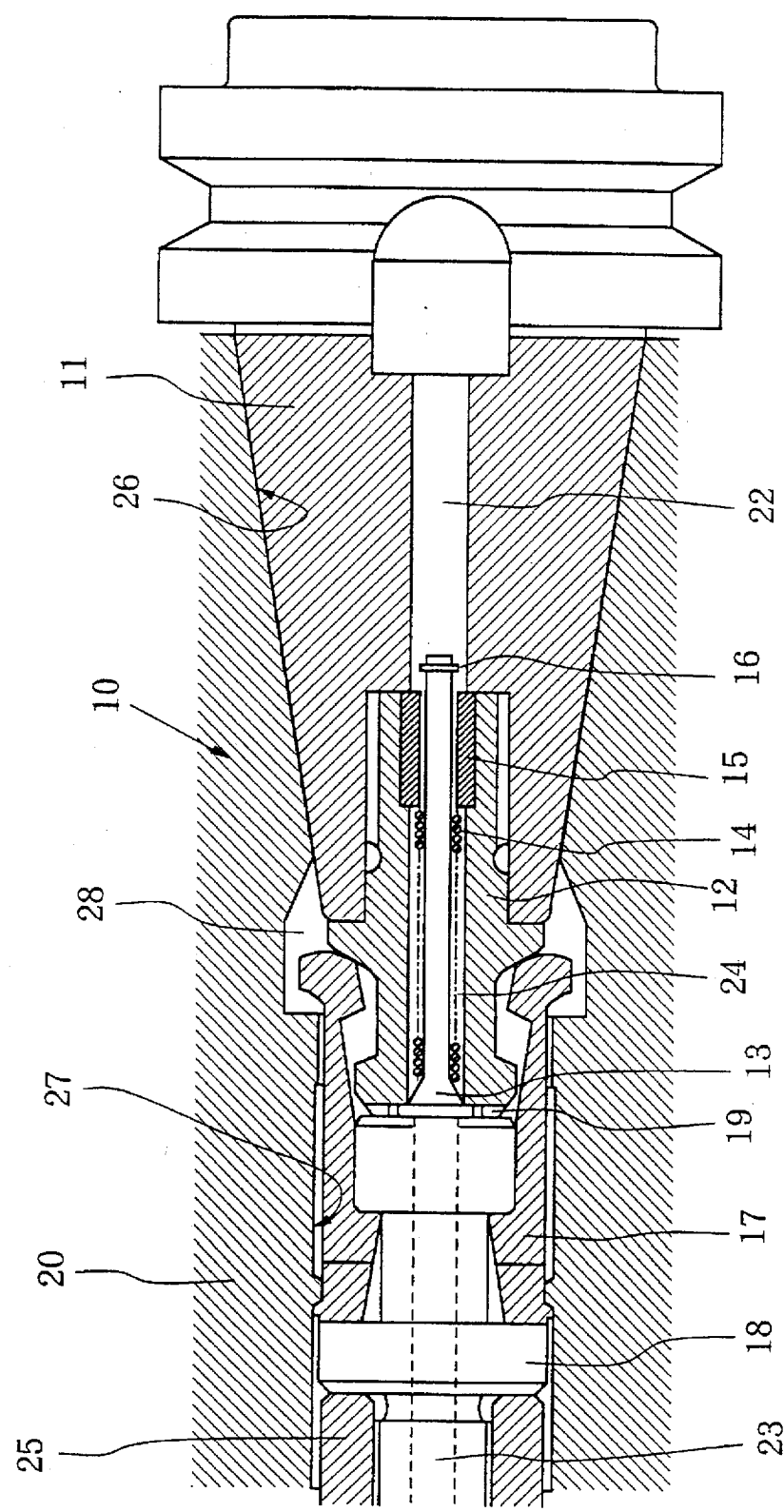
FIG. 2 is a sectional view showing a spindle device according to an embodiment of the present invention, showing the state where a tool holder is just being pushed out.

FIGS. 1 and 2 are sectional views showing a main part of the spindle device according to the present invention. FIG. 1 shows the state where the tool holder is mounted (clamped), whereas FIG. 2 shows the state where the tool holder is just being pushed out (unclamped).

A spindle device 10 is set in a spindle head of a conventional machining center, wherein a tool holder 11 is automatically changed by an automatic tool change arm.

The spindle device 10 is provided with a spindle 20 which can be rotated at a high speed.

The spindle 20 has an axial hole 27 on its axis and a tapered support portion 26 for accepting a tool holder 11 formed at the front end of the axial hole 27.

A drawing bolt 25 (only the front end of which is shown in FIGS. 1 and 2) is inserted into the axial hole 27 of the spindle 20. The drawing bolt 25 is axially slidable and is strongly urged rearward by a number of plate springs. When the drawing bolt 25 is moved forward by a pushing means, the tool holder 11 is unclamped (FIG. 2).

A passage for a coolant (not shown in Figures) is formed on the axis of the drawing bolt 25. The passage is used also as a passage for air. To this passage are connected a coolant supply means and an air supply means in parallel (both of which are not shown).

An inner sleeve 18 is connected to the front end of the drawing bolt 25. A passage 23 for a coolant and air is formed on the axis of the inner sleeve 18.

A collet 17 for gripping a pull stud 12 of the tool holder 11 is mounted at the end of the inner sleeve 18. The front portion of the collet 17 is divided into, for example, four sections in a circumferential direction. In the collet 17, when its front portion is positioned in an escape portion 28 as shown in FIG. 2, the front end can open to release (insert) the pull stud 12. On the other hand, in the state shown in FIG. 1, the front end of the collet 17 is closed so that the pull stud 12 is firmly gripped.

The tool holder 11 is formed on the axis with a coolant passage 22. The coolant passage 22 is large in diameter at the rear end thereof, on which the pull stud 12 is mounted. The pull stud 12 has a valve.

The valve of the pull stud 12 has a function to open and close the coolant passage 22 of the tool holder 11. This valve is constructed by a stop needle 13 as a valve body, (valve member) a guide piece 15 for guiding the former, a stainless spring 14 for urging the stop needle 13 backward, and an E-shaped snap ring 16 for preventing the stop needle 13 from being detached.

The pull stud 12 has a through-hole on the axis, into which the stop needle 13 is axially slidably inserted. The outside diameter of the stop needle 13 is somewhat smaller than the diameter of the through-hole of the pull stud 12; thereby a coolant passage is formed therebetween.

The stop needle 13 is spread at the rear end in the form of a truncated cone, which acts as a valve body. The pull stud 12 is formed at the rear end with a valve seat 29 corresponding in shape to the valve body of the stop needle 13.

The valve body of the stop needle 13 is certainly engaged with the valve seat 29 of the pull stud 12 when the front end face of the inner sleeve 18 is pressed against the rear end face of the stud bolt 12 so that the valve becomes a closed state (see FIG. 2). Therefore the connection between the passage and the coolant passage 22 is shut off.

The stop needle 13 is axially movably guided by the guide piece 15. A clearance is also formed between the stop needle 13 and the guide piece 15 to form a passage for a coolant.

The stop needle 13 is urged rearward by the stainless spring 14 and stopped at the initial position shown in FIG. 1 by the E-shaped snap ring 16. The E-shaped snap ring 16 has a notch so that even in the stopped state, the passage for coolant is defined therethrough.

Figure 3:
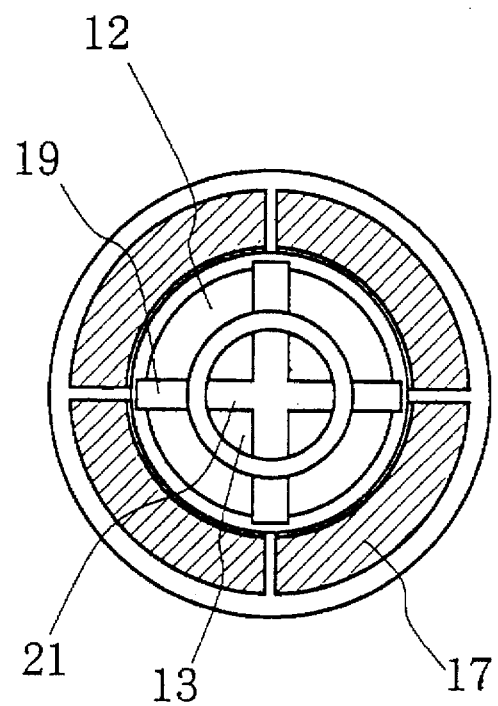
FIG. 3 is a sectional view taken on line A—A of FIG. 1.
Figure 4:
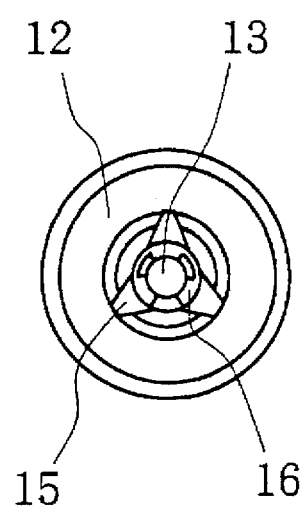
FIG. 4 is a view of a pull stud with a valve as viewed from a forward position.

A cross channel 21 (first flow passage) is formed in the enlarged rear end face of the stop needle 13, as shown in FIG. 3. A slot 19 (second flow passage) is formed also in the rear end face of the pull stud 12. When the valve is closed as shown in FIG. 2, the channel 21 and the slot 19 come into communication to define an air passage (bypass). The opposed ends of both the grooves 21 and 19 are remote from each other and a ring or annular groove is defined therebetween.

The operation of the valve of the pull stud 12 will be described.

In the clamped state shown in FIG. 1, the valve is open. That is, the truncated cone valve body of the stop needle 13 is distant from the valve seat 29 of the pull stud 12 by the biasing force of the stainless spring 14, and the passage 23 of the inner sleeve 18 is in communication with the passage 22 of the tool holder 11.

In this state, the coolant supplied from the coolant supply means is sent to the coolant passage 22 of the tool holder 11 through the passage of the drawing bolt 25, the passage 23 of the inner sleeve 18 and the passage within the pull stud 12, and is supplied to workpieces and a tool for cooling and lubricating.

On the other hand, when the tool holder is changed, the drawing bolt 25 and the inner sleeve 18 are slidably moved in the direction of the tool holder 11 by the pushing mechanism to unclamp the tool holder. At this time, the supply of the coolant stops and the air blow starts.

FIG. 2 shows the state where the front end face of the inner sleeve 18 is moved forward until it engages the rear end surface of the pull stud 12. On the way of said movement, the stop needle 13 is forced into the pull stud 12 against the biasing force of the stainless spring 14 so that a funnel-like valve body of the stop needle 13 is firmly engaged with the valve seat 29 of the pull stud 12. The cross channel 21 at the rear end face of the stop needle 13 and the slot 19 at the rear end face of the pull stud 12 come into communication with the passage 23 of the inner sleeve 18.

When the tool change procedure goes on, the tool holder 11 is released from the supporting surface 26 of the spindle 10. At the moment when the tool holder 11 is slightly distant from the support surface 26 of the spindle 10, the air blow is passed through the channel 21, the slot 19 and the escape portion 28 of the spindle 20 and forcefully discharged forward through a discharge path between the tool holder 11 and the supporting surface 26 of the spindle 10.

As described above, the valve of the pull stud 12 is temporarily closed and the coolant passage 22 is closed so that a bypass for an air blow is formed. Thereby, the air blow can be concentrated in the area between the set surface 26 of the spindle 10 and the tool holder 11. Accordingly, a very efficient cleaning can be performed by an air blow.

It is easily understood that also when the tool holder 11 is set to the spindle 20, the aforementioned cleaning operation can be carried out in a similar manner.

As described above, by temporarily closing the coolant passage 22 by the function of the valve of the pull stud 12, an efficient air blow can be carried out, thereby the tool holder 11 can be mounted on the spindle with high accuracy.

It is to be noted that the present invention is not limited to the above-described embodiment. The spindle device of the present invention is characterized in that the pull stud having a valve is attached to the tool holder, and an air blow temporarily bypasses the coolant passage by means of the valve. Thus to the other constitutions, the same constructions as the conventional machining center can be employed without modification.

I claim:

1. A spindle device for supplying an air for cleaning and a coolant for cooling and lubricating, comprising:

a tool holder (11) having a coolant passage (22) through which a coolant is supplied;

a spindle (10) having a support portion (26) formed at a front end thereof for accepting the tool holder (11);

a drawing bolt (25) having a through-hole for supplying air and a coolant and movably arranged in the spindle

(10) for clamping and unclamping the tool holder (11) accepted on the support portion (26) of the spindle (10);

a pull stud (12) attached on the tool holder (11), said pull stud comprising a valve seat; and a valve (13) comprising a valve member cooperating with said valve seat, said valve member having a first flow passage, said valve seat having a second flow passage, said first and second flow passages forming a bypass to provide fluid communication from the through-hole to a discharge path between the tool holder and the spindle when said valve is temporarily closed by seating the valve member against the valve seat, the valve (13) being located in association with the coolant passage (22) and the through-hole, the valve (13) being so constructed as to open and close according to the movement of the drawing bolt (25) in such a manner that the valve (13) opens so as to connect the through-hole to the coolant passage (22) when the tool holder (11) is clamped, and the valve (13) temporarily closes so as to shut the connection between the through-hole and the coolant passage (22) when the tool holder (11) is unclamped, wherein a coolant can be supplied from the through-hole to the coolant passage (22) via the valve (13) when the tool holder (11) is clamped, and air can be supplied from the through-hole through said bypass and discharge path when the tool holder (11) is unclamped.

2. A spindle device according to claim 1, wherein the valve (13) is located at a rear portion of the tool holder (11).

3. A spindle device according to claim 1, wherein the valve (13) is constructed as a slide valve (13).

4. A spindle device according to claim 2, wherein the valve member (13) comprises a slidable stop needle (13) biased by a spring (14) into engagement with said valve seat (29) formed on a rear portion of the pull stud (12).

5. A spindle device according to claim 4, wherein the valve seat has a cone surface (29) and the stop needle has a truncated cone surface cooperating with the cone surface (29) of the valve seat.

6. A spindle device according to claim 4, wherein the slide valve (13) is constructed in such a manner that the stop needle (13) is directly pushed forward by an inner sleeve (18) attached at a front end of the drawing bolt (25) when the tool holder (11) is unclamped.

7. A spindle device according to claim 6, wherein the stop needle (13) has a radial channel (21) on a rear face as said first flow passage, and the pull stud (12) has a radial slot (19) connectable to the radial channel (21) as said second flow passage, and wherein the channel (21) and the slot (19) are connected to each other when the valve is closed so as to define an air passage communicating with the through-hole of the drawing bolt (25).

8. A spindle device according to claim 7, wherein the radial channel (21) is a cross channel (21) that extends in a cross shape across the rear face of the stop needle.

9. A spindle device according to claim 8, wherein an annular groove is defined between the cross channel (21) and the slot (19) when the valve is closed.

* * * * *